US006810025B2

(12) United States Patent
Chung

(10) Patent No.: US 6,810,025 B2
(45) Date of Patent: Oct. 26, 2004

(54) DTMF TRANSMISSION STRUCTURE OF W-CDMA WLL SYSTEM

(75) Inventor: Woo Sung Chung, Anyang (KR)

(73) Assignee: LG Electronics Inc., Seoul (KR)

( * ) Notice: Subject to any disclaimer, the term of this patent is extended or adjusted under 35 U.S.C. 154(b) by 781 days.

(21) Appl. No.: 09/729,098

(22) Filed: Dec. 5, 2000

(65) Prior Publication Data

US 2001/0002903 A1 Jun. 7, 2001

(30) Foreign Application Priority Data

Dec. 7, 1999 (KR) .......................................... 1999-55303

(51) Int. Cl.[7] ............................................... H04B 3/20
(52) U.S. Cl. .................. 370/286; 379/406.01; 370/328
(58) Field of Search ................. 370/282, 286, 370/287, 288, 289, 290, 291, 292, 335, 342, 441, 328; 379/406.01, 406.05, 406.06, 406.12, 406.08; 455/550.01, 554.2

(56) References Cited

U.S. PATENT DOCUMENTS

| | | | | | |
|---|---|---|---|---|---|
| 5,459,781 | A | * | 10/1995 | Kaplan et al. | 379/351 |
| 5,533,121 | A | * | 7/1996 | Suzuki et al. | 379/406.02 |
| 5,790,658 | A | * | 8/1998 | Yip et al. | 379/406.09 |
| 5,909,432 | A | * | 6/1999 | Arends et al. | 370/261 |
| 5,920,834 | A | * | 7/1999 | Sih et al. | 704/233 |
| 6,061,444 | A | * | 5/2000 | Kawahara et al. | 379/460.08 |
| 6,081,593 | A | * | 6/2000 | Kim | 379/406.08 |
| 6,199,036 | B1 | * | 3/2001 | Ahmadi | 704/207 |
| 6,259,905 | B1 | * | 7/2001 | Berkowitz et al. | 455/401 |
| 6,628,779 | B1 | * | 9/2003 | Pietrowicz | 379/404 |
| 6,628,780 | B2 | * | 9/2003 | Duttweiler et al. | 379/406.08 |

OTHER PUBLICATIONS

Raman et al. "Fast Echo Cancellation in a Voice-Processing System" 1992 IEEE International Conference on , vol: 4, Mar. 23–26, 1992, pp.:513–516 vol. 4.*

* cited by examiner

Primary Examiner—Bob A. Phunkulh
(74) Attorney, Agent, or Firm—Fleshner & Kim, LLP

(57) ABSTRACT

A DTMF transmission structure of a W-CDMA WLL system in which a DTMF signal is transmitted and received to and from a switching system through a terminal station and a base station controller, each of the terminal station and the base station controller comprising: an echo canceller for extracting an echo component from a received signal; a DTMF detector for discriminating whether a signal to be transmitted is a DTMF signal and controlling the operation of the echo canceller; an adder for adding the signal to be transmitted and the output of the echo canceller; a VOCODER for coding the output signal of the adder to a bit stream form or decoding the received signal in the bit stream form to an analog signal; an adjusted DTMF detector for detecting a digit component from the output of the VOCODER; a DTMF generator for reproducing a normal DTMF signal according to the detected digit component; and a silence generator for generating a silence for a predetermined time immediately after the DTMF signal is reproduced.

11 Claims, 2 Drawing Sheets

DTMF TRANSMISSION STRUCTURE OF W-CDMA WLL SYSTEM

BACKGROUND OF THE INVENTION

1. Field of the Invention

The present invention relates to a W-CDMA (Wideband CDMA) WLL system, and more particularly to a DTMF transmission structure of a W-CDMA WLL system.

2. Description of the Background Art

Generally, in a conventional communication system in which voice is coded by using a Waveform Coding-based PCM, a DTMF signal is transmitted through the same transmission structure as that of a voice signal.

Accordingly, in view of the characteristics of the waveform coding method, even though an original signal is coded or decoded, there occurs little spectrum distortion, so that, even in case of the DTMF signal, it can be transmitted without causing a problem.

However, in a communication system using a parameter/hybrid coding-based VOCODER (a voice coder/decoder), the characteristics of the vocoder is optimized for a voice signal. Thus, when a DTMF signal is transmitted therethrough, there may occur a spectrum distortion in its original signal, so that there is a high possibility that a receiving party including a switching terminal recognizes the DTMF signal erroneously.

In an effort to solve the problem, a commercially used PCS system adopts a method in which when a DTMF signal is transmitted, a input digit value is stored, and the stored information is transmitted by a different transmission method to that of a voice signal, and then the corresponding DTMF signal is reproduced for a predetermined time and transmitted to a switching terminal.

However, in case of the W-CDMA (Wideband CDMA) WLL system which mixedly uses the PCM method and the VOCODER method, since no transmission structure has been defined for the DTMF signal, the DTMF signal is transmitted through the general transmission structure for the voice signal.

Figure is a DTMF transmission structure adopting the W-CDMA WLL system in accordance with a conventional art.

As shown in the drawing, in the conventional DTMF transmission structure, the DTMF signal is transmitted between a terminal 10 and a switching system 40 through a terminal station 20 and a base station controller. The terminal station 20 and the base station controller 30 includes an adder 12, a VOCODER 13 and an echo canceller 14, respectively, and a hybrid unit 11 is connected to an input terminal of the adder 12 at the side of the terminal 10.

The hybrid unit 11 serves to match a 2-wire analog duplex signal (a voice signal or a DTMF signal) inputted/outputted to/from the terminal 10 to a 4-wire analog simplex signal. The adder 12 serves to remove an echo component provided from an echo canceller 15, from the voice signal outputted from the hybrid unit 11. In this case, the input signal and the echo component have the opposite phase to each other, and the signal between the hybrid unit 11 and the VOCODER 13 is a digital signal.

As an element to code or decode an analog voice signal to a digital signal (bit stream) having a low transfer rate, the VOCODER 13 codes a voice signal outputted from the adder 12 to a bit stream form or decodes a signal to a bit stream form inputted through a CDMA modem unit (not shown) to a voice signal.

The operation for transmitting the DTMF signal in the conventional DTMF transmission structure constructed as described above will now be explained.

First, the DTMF signal is transmitted from the terminal 10 to the switching system 40 or from the switching system 40 to the terminal 10. For the explanation's convenience, the case of DTMF signal transmitted from the terminal 10 to the switching system 40 is taken as an example.

When a user dials a specific number of a target terminal by using the terminal 10 connected to the terminal station 20, the dialed digits, that is, the DTMF signal of the corresponding dial is inputted through the hybrid unit 11 to the adder 12.

However, a leakage current is generated in the hybrid unit 11 due to an impedance matching physically existing therein to match the 2-wire duplex signal and the 4-wire simplex signal, so that an echo phenomenon occurs when the voice signal is transmitted.

Accordingly, in order to cancel the echo component of the output signal of the hybrid unit 11, the echo canceller 14 extracts an echo component from the VOCODER 13 and provides it to the adder 12. Then, the adder 12 subtracts the output signal of the echo canceller 14 from the output signal of the hybrid unit 11, thereby canceling the echo component included in the DTMF signal.

The DTMF signal with the echo component removed is coded to a bit stream form by the VOCODER 13, and then transmitted through the CDMA modem unit and the RF unit to the base station. The RF signal transmitted to the base station is demodulated to a bit stream form by the RF unit and the CDMA modem unit, and the demodulated signal is decoded to a DTMF signal in the VOCODER 13 of the base station controller 30 and transmitted to the switching system 40.

As stated above, since a transmission structure for the DTMF signal is not defined in the W-CDMA WLL system, the DTMF signal is transmitted through the same transmission structure as that of the general voice signal.

However, the VOCODER is fabricated suitable to code or decode a voice signal. Thus, in case that the DTMF signal is coded or decoded by using the VOCODER, a frequency spectrum of the DTMF signal is distorted In addition, in the conventional transmission structure of the voice signal, the echo component included in the input DTMF signal is forcibly cancelled by the echo canceller. In this respect, in case of the voice signal, the echo cancelling does not cause a problem, but, in case of the DTMF signal, the echo cancelling causes a spectrum distortion. Moreover, such spectrum distortion caused due to the echo cancelling becomes more seriously made as the DTMF signal passes through the VOCODERs of the terminal station 20 and of the base station controller 30.

Accordingly, the spectrum distortion of the DTMF signal due to the echo cancelling and the characteristic of the VOCODER brings about a malfunction in various systems required for signal transmission in the DTMF signal form as well as in the switching terminal, having a bad influence on a reliability of the systems.

SUMMARY OF THE INVENTION

Therefore, an object of the present invention is to provide a DTMF transmission structure of a W-CDMA WLL system which is capable of transmitting a high-quality DTMF signal to a receiving party by using an existing voice signal transmission structure.

Another object of the present invention is to provide a DTMF transmission structure of a W-CDMA WLL system which is capable of effectively preventing a spectrum distortion of a DTMF signal caused due to a VOCODER characteristic and a echo cancelling.

To achieve these and other advantages and in accordance with the purpose of the present invention, as embodied and broadly described herein, there is provided a DTMF transmission structure of a W-CDMA WLL system having a terminal station and a base station controller which are formed symmetrically, each including: an echo canceller for extracting an echo component from a received signal; a DTMF detector for discriminating whether a signal to be transmitted is a DTMF signal and controlling the operation of the echo canceller; an adder for canceling an echo component of the echo canceller from the signal to be transmitted; a VOCODER for coding the output signal of the adder to a bit stream form or decoding the received signal in a bit stream to an analog signal; an adjusted DTMF detector for detecting a digit component from the output of the VOCODER; A DTMF generator for reproducing a normal DTMF signal according to the detected digit component; and a silence generator for generating a silence for a predetermined time immediately after the DTMF is generated.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 2:
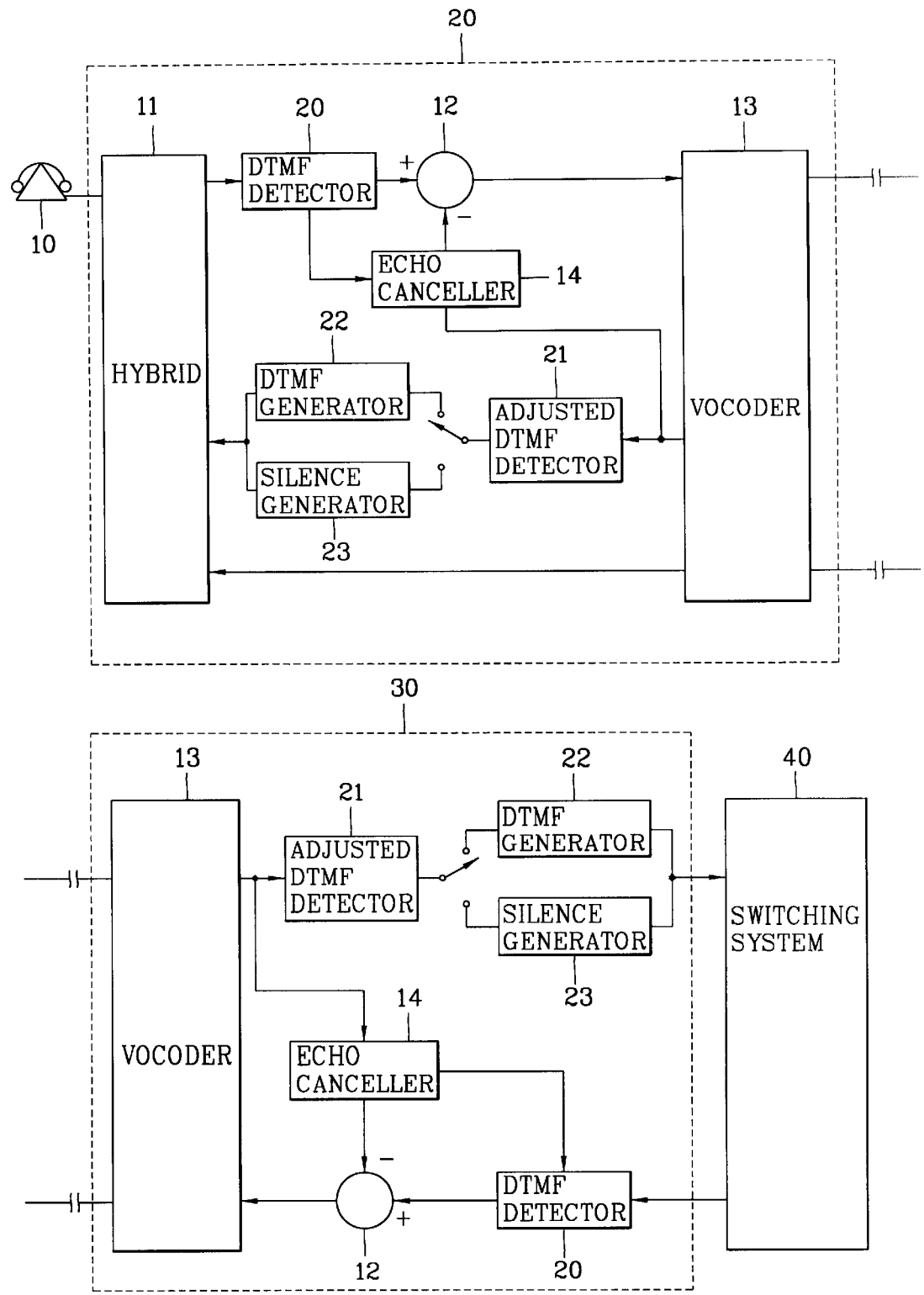
FIG. 2 illustrates a DTMF transmission structure of a W-CDMA WLL system in accordance with the present invention.

FIG. 2 illustrates a DTMF transmission structure of a W-CDMA WLL system in accordance with the present invention.

Figure 1:
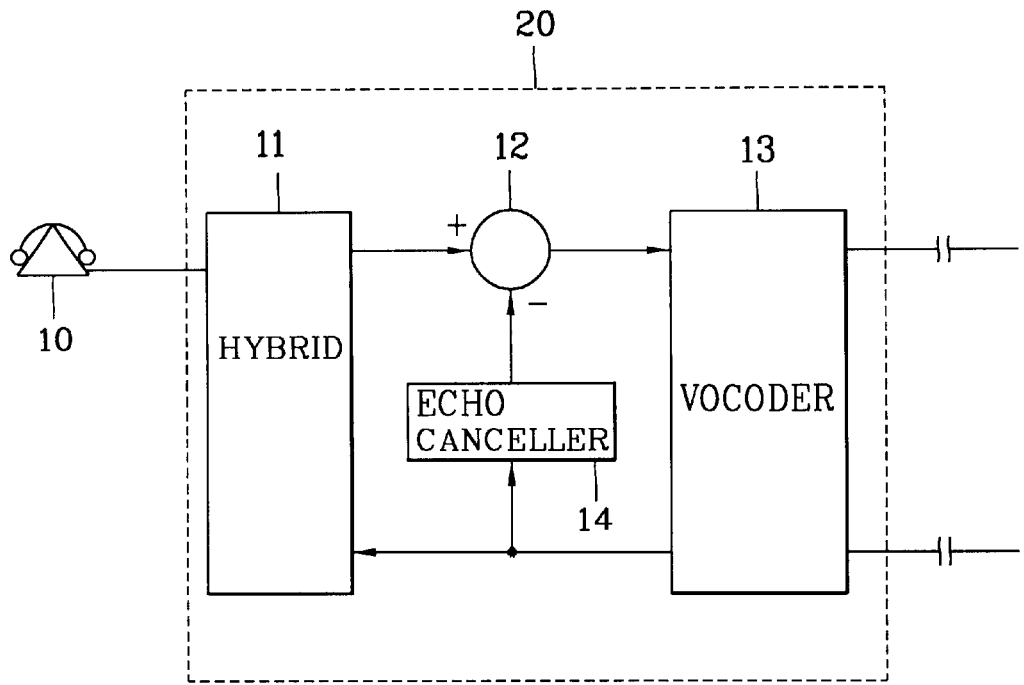
FIG. 1 illustrates a DTMF transmission structure of a W-CDMA WLL system in accordance with a conventional art.
Figure 1:
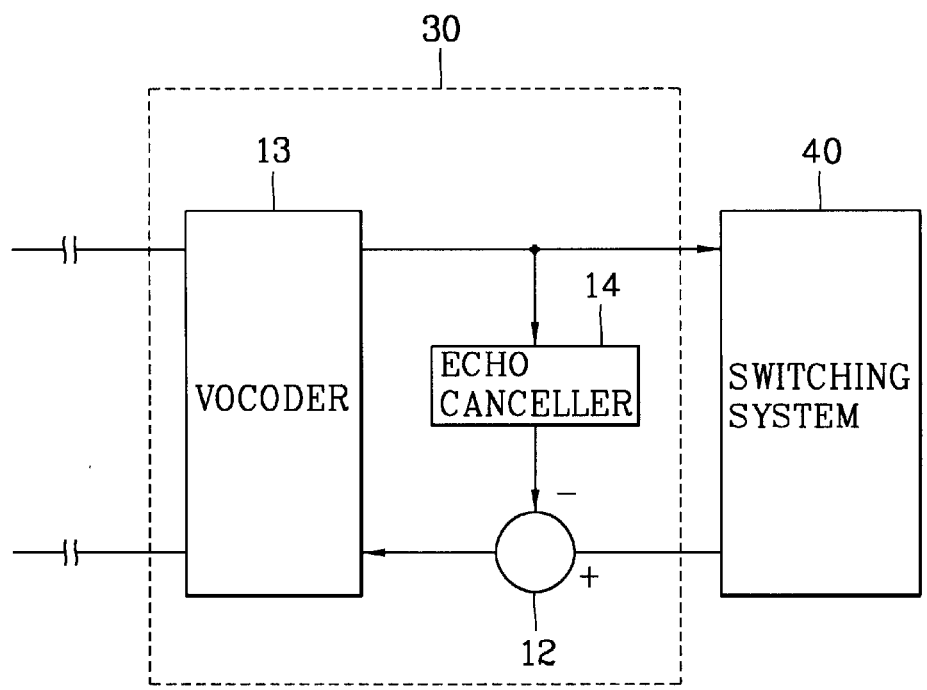

As shown in the drawing, a DTMF transmission structure of a W-CDMA WLL system of the present invention additionally includes a DTMF detector 20, an adjusted DTMF detector 21, a DTMF generator 22 and a silence generator 23 in each of the terminal station 20 and the base station controller 30 of the conventional voice signal transmission structure as shown in FIG. 1.

The DTMF detector 20 discriminates whether an output signal of the hybrid unit 11 is a voice signal or a DTMF signal and turns on or off the echo canceller 14.

The adjusted DTMF detector 21 detects DTMF signal information (digit) from an output signal of the VOCODER 13.

The DTMF generator 22 reproduces a normal DTMF signal according to the digit information detected by the adjusted DTMF detector 21.

The silence generator 23 forcibly transmits a silence for a predetermined time after the DTMF signal is reproduced.

The operation of the DTMF transmission structure of the present invention constructed as described will now be explained with reference to FIG. 2.

When a signal is inputted from the terminal 10, the signal is transmitted through the hybrid unit 11 to the DTMF detector 20. At this time, the input signal is a voice signal or a DTMF signal.

The DTMF detector 20 discriminates whether the corresponding input signal is a voice signal or a DTMF signal. Upon discrimination, in case that the input signal is a DTMF signal, the DTMF detector 20 turns off the echo canceller 14 to prevent distortion of the DTMF signal due to the echo canceller 14 of the terminal station 20.

Consequently, the DTMF signal, which was not echo-cancelled, that is, which does not include a distortion component, is transmitted to the base station controller 30 through the same system as that of the voice signal transmission structure.

That is, the DTMF signal is converted into a bit stream form by the VOCODER 13 and transmitted through the CDMA modem unit and the RF unit to the base station.

Meanwhile, in case that input signal is a voice signal, the DTMF detector 20 turns on the echo canceller 14, so that the echo cancelling operation can be performed for the voice signal as in the conventional art.

The RF signal transmitted through the RF unit and the CDMA modem unit of the base station to the base station controller 30 is restored to a DTMF signal in the VOCODER 14. The restored DTMF signal includes a spectrum distortion due t the characteristic of the VOCODER 14. Thus, the adjusted DTMF detector 21 detects DTMF signal information (digit) from the DTMF signal which includes the spectrum distortion, and the DTMF generator 22 reproduces a normal DTMF signal according to the detected DTMF signal component. And then, the reproduced DTMF signal is transmitted to the switching system 40.

The silence generator 23 transmits a silence for a predetermined time to remove the unnecessary noise component (echo) possibly generated immediately after the DTMF signal is reproduced. That is, when the DTMF signal is inputted, since the echo canceller 14 is turned off, the silence generator 23 transmits a mule for a predetermined time to remove an echo component that has not been canceled by the echo canceller 14, thereby having an effect of a forcible pause interval.

In the above descriptions, for the explanation's convenience, the DTMF signal transmitted from the terminal 10 to the switching system 40 is taken as an example. In case of a DTMF signal transmitted from the switching system 40 to the terminal 10, it is transmitted in the same processes.

As so far described, according to the DTMF transmission structure of a W-CDMA WLL system of the present invention, the DTMF signal is transmitted by using the existing voice signal transmission structure. Thus, a high-quality DTMF signal can be transmitted to a receiving party without any extra transfer protocol.

In addition, the spectrum distortion of the DTMF signal caused due to the characteristic of the VOCODER and the echo cancelling can be effectively prevented, so that any erroneous recognition for the DTMF signal does not made by the receiving party.

Furthermore, since the DTMF signal can be detected by the terminal station and by the base station controller, the detected DTMF signal can be easily used to implement other systems.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. In a DTMF transmission structure of a W-CDMA WLL system in which a DTMF signal is transmitted and received to and from a switching system through a terminal station and a base station controller, each of the terminal station and the base station controller comprising:

an echo canceller for extracting an echo component from a received signal;

a DTMF detector for discriminating whether a signal to be transmitted is a DTMF signal and controlling the operation of the echo canceller;

an adder for adding the signal to be transmitted and the output of the echo canceller;

a VOCODER for coding the output signal of the adder to a bit stream form or decoding the received signal in the bit stream form to an analog signal;

an adjusted DTMF detector for detecting a digit component from the output of the VOCODER;

a DTMF generator for reproducing a normal DTMF signal according to the detected digit component; and a silence generator for generating a silence for a predetermined time immediately after the DTMF signal is reproduced.

2. The structure according to claim 1, wherein the terminal station further comprises a hybrid unit connected to the DTMF detector and with the DTMF generator.

3. The structure according to claim 1, wherein the DTMF detector turns off the echo canceller in case that the signal to be transmitted is a DTMF signal.

4. The structure according to claim 1, wherein the terminal station and the base station controller have the symmetrical transmission structures.

5. A DTMF transmission structure of a W-CDMA WLL system adopting a VOCODER, comprising:

an echo canceller for extracting an echo component from a received signal;

a DTMF detector for discriminating whether a signal to be transmitted is a DTMF signal and controlling the operation of the echo canceller;

an adder for canceling an echo component of the echo canceller from the signal to be transmitted;

a first VOCODER for coding the output of the adder to a bit stream form and transmitting it;

a second VOCODER for decoding the output signal of the first VOCODER to a bit stream form;

an adjusted DTMF detector for detecting a digit component from the output of the second VOCODER;

a DTMF generator for reproducing a normal DTMF signal according to the detected digit component; and a silence generator for generating a silence for a predetermined time immediately after the DTMF signal is reproduced.

6. The structure according to claim 5, wherein the DTMF detector turns off the echo canceller in case that the signal to be transmitted is a DTMF signal.

7. The structure according to claim 5, wherein the first VOCODER is implemented in the terminal station while the second VOCODER is implemented in the base station controller.

8. The structure according to claim 5, wherein the first VOCODER is implemented in the base station controller while the second VOCODER is implemented in the terminal station.

9. The structure according to claim 5, wherein the signal to be transmitted is a signal to be transmitted from the terminal through the base station controlled to the switching system or a signal to be transmitted from the switching system through the base station controller to the terminal.

10. The structure according to claim 5, wherein the received signal is a signal that has been transmitted from the base station controller to the terminal station or a signal that has been transmitted from the terminal station to the base station controller.

11. The structure according to claim 5, wherein a hybrid unit is connected to an input terminal of the DTMF detector of the terminal station.

* * * * *